RE 25788
July 3, 1962  D. S. SHERIDAN  3,042,045
MEDICO-SURGICAL TUBES HAVING INTEGRAL CONNECTORS
FORMED IN THEIR ENDS
Filed July 2, 1958
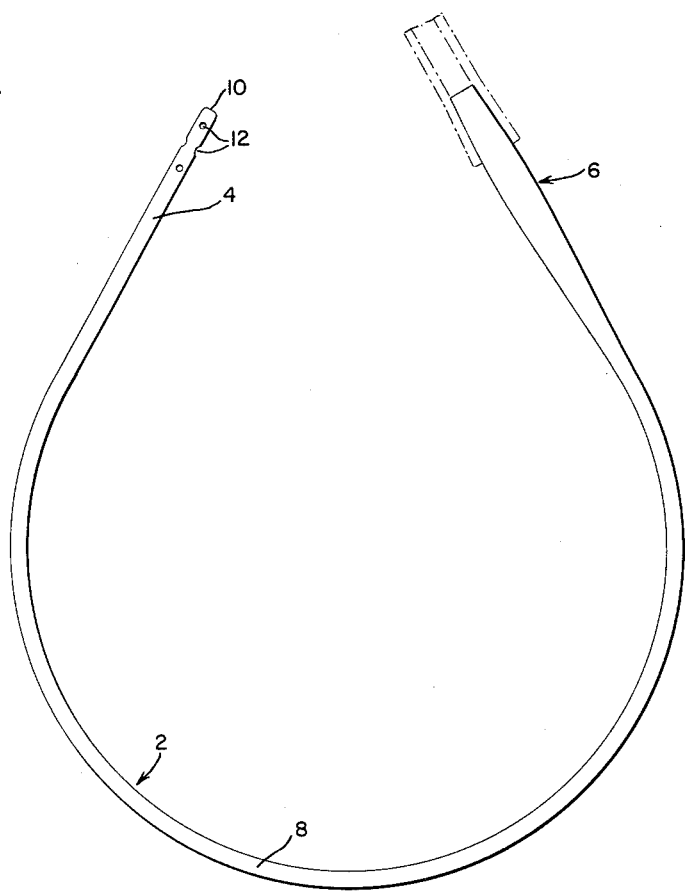
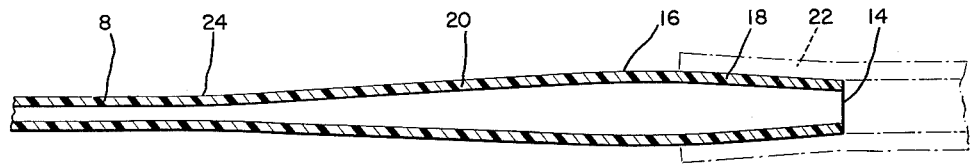
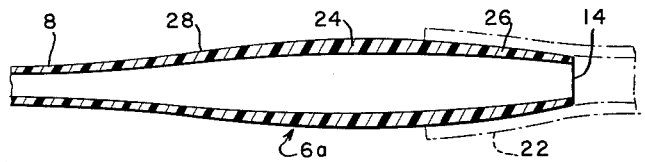
INVENTOR.
DAVID S. SHERIDAN
BY Kenon and Palmer
ATTORNEYS 3,042,045
MEDICO-SURGICAL TUBES HAVING INTEGRAL
CONNECTORS FORMED IN THEIR ENDS
David S. Sheridan, P.O. Box 147, Argyle, N.Y.
Filed July 2, 1958, Ser. No. 746,134
2 Claims. (Cl. 128—349)

This invention relates to medico-surgical tubes which have connectors formed as an integral part of an end thereof. More particularly, the invention is concerned with seamless catheters and related surgical tubes made by the extrusion of water proof, flexible plastic material to include a tubing connector formed integrally in the catheter by double tapering of the catheter walls at the proximal end thereof.

Field of Invention

One of the principal uses of catheters is the conveyance of fluid to or from internal living tissues or organs during medical or surgical treatments. In such cases, it is usually necessary during the use of the catheter to connect the proximal end thereof to some other device, piece of equipment, container, or the like. For example, catheters are often used for intestinal feeding and it is necessary to connect, in such cases, the proximal end of the catheter to a source of nutritional liquid to be conveyed by the catheter into the interior of the body. Similarly, catheters are used to introduce oxygen into the lung of a patient and, in this case, it is necessary that the oxygen catheter be connected to a source of sterile oxygen.

The container, syringe, apparatus, or other element to be connected to the proximal end of a catheter is often remotely located from the patient and the proximal end of the catheter, so that it is frequently necessary to employ a length of connecting tube to join the catheter end to the container or other device. Sections of gum rubber tubing are commonly employed for this purpose and, more recently, sections of extruded plastic tubing have also been used. Obviously, some method or device must be provided for making a fluid-tight connection between the proximal end of the catheter and the section of connecting tube. Even if a syringe, container or similar device is close enough to the patient that a connecting tube is not needed, some means must exist for making the fluid-tight connection of catheter to other element.

Heretofore, there have been two general methods used for making a connection between a catheter and a tubular element. One of these connecting methods involves the use of short, double-male serrated or ribbed tubing connectors. The connection is made by inserting one end of such a tubing connector into the open end of the catheter, forcing the inside walls of the catheter over the ribs or serrations to form a fluid tight connection to the connector. In similar fashion, the remaining end of the ribbed or serrated tubing connector is forced into a length of tubing or other element to be connected to the catheter. Such tubing connectors have, in the past, been formed of metal or glass and more recently have been molded from plastic material, e.g., nylon.

Connections of catheters to adapters, syringes or other elements have also been made in another general manner. Thus, instead of forming catheters with straight outside and inside walls at the proximal end, it is standard practice to form proximal ends of catheters in the shape of a funnel. Connection is made between a syringe or other element in catheters of this funnel-end type by forcing the tapered end of the syringe, adapter, connector or the like into the funnel end of the catheter, the inside walls of the catheter end and the outside tapered walls of the syringe, adapter or the like being shaped and sized so that satisfactory mating of the surfaces can be obtained in order to create a fluid-tight connection between the catheter and the syringe, adapter or the like.

The method of connecting catheters with lengths of tubing or other elements by the use of the double-male type tubing connectors, as explained above, has several disadvantages, although it is very extensively practiced. Thus, it requires the use of an additional piece of equipment, namely, the ribbed or serrated connector, which not only adds to the cost of a particular set-up, but which also creates problems in manipulation and handling. Furthermore, the ribs or serrations on such connectors can harbor contaminating micro-organisms which create problems in the sterilization of the intubation equipment.

The funnel-end type of connection between the catheter and syringe or other element, as discussed above, is convenient, quick and generally satisfactory. However, this connection method has the disadvantage that it is limited to assembly of the catheter with syringe tips, adapters or other elements of certain specific size and taper shape. In other words, the funnel-end type catheters are limited in the scope of their use to certain applications or equipment arrangements because of the funnel shape of the proximal end of such catheters. Obviously it would be highly desirable to have catheters which would be of a "universal" connector-end variety, so that they could be used to make connections of the type now practiced with funnel-end type catheters, as well as straight-end catheters which utilize the ribbed or serrated connectors as discussed above.

Objects

A principal object of this inventtion is the provision of new forms of medico-surgical tubes provided with tubing connectors formed as an integral part of the tube on an end thereof. Further objects include:

(1) The provision of seamless catheters which have a proximal end so formed that it has "universal" adaptability for use with all standard connectors and connecting procedures now employed in making fluid tight connections between the proximal end of a catheter and a syringe, length of connecting tubing, adapter, source of fluid supply, or the like.

(2) The provision of catheters having tubing connectors formed in the proximal end thereof with which it is possible to make a tighter and firmer connection to gum rubber tubing or other connecting tubing than is possible with any standard ribbed or serrated connection device now employed in conjunction with catheters.

(3) The provision of catheters which make possible better and more positive connection between the proximal end thereof and connecting tubing than has been possible with catheters known heretofore.

(4) The provision of catheters having integral proximal-end connectors which make possible increased safety of use because all parts of the catheters and tubing connector are transparent, so that all parts thereof can be inspected to determine that no foreign matter is present in the catheter prior to use.

(5) The provision of seamless catheters which have continuous and smooth inside and outside walls on which there are no grooves, offsets or the like to harbor bacteria or other matter which might be injurious to the patient as a result of use of the catheter.

(6) The provision of new forms of catheters which have less tendency to pinch off or collapse the lumen when the proximal end is bent at an abrupt angle, e.g., such as may occur during insertion or subsequent use of the catheter.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

General Description

These objects are accomplished according to the present invention by forming integrally in the proximal end of catheters, and related medico-surgical tubes, connecting devices by double tapering of the catheter walls at the proximal end to form connectors which are defined by an open end tip, an outwardly extending tapered portion which extends distally a short distance from said tip, and an inwardly tapered portion which extends distally from said outwardly tapered portion. Preferably, the catheters are formed by the extrusion of waterproof flexible plastic material to create catheters which are seamless, non-fibrous, and which have continuous and smooth external and internal walls, except for ports, openings or the like which may extend through the walls at the distal end.

A more complete understanding of the new forms of catheters provided by this invention can be had by reference to the accompanying drawings, in which:

FIG. 1 is a plan view of a catheter provided with an integral tubing connector formed in accordance with this invention, this figure illustrating the catheter on a scale of 1 to 1;

FIG. 2 is a fragmentary longitudinal sectional view of the proximal end of the catheter of FIG. 1, this figure showing the catheter on an enlarged scale of 2 to 1;

FIG. 3 is a fragmentary longitudinal sectional view of a modified form of the new connector end catheters.

Detailed Description

Referring in detail to the drawings, the catheter 2 comprises a distal end 4, a connector 6 formed as an integral part of the catheter on the proximal end, and a tubular section 8 of controlled wall thickness along its length, which joins the distal end 4 to the connector 6.

The catheter illustrated in FIG. 1 is of the "open end" type, i.e., a style of catheter commonly used as oxygen catheters. In this form of catheter, the distal end has an opening in the tip 10, plus a plurality of spaced apart ports 12. Aside from such distal end openings as ports 12, the catheters of this invention have seamless walls which are continuous and smooth along the entire inside and outside lengths thereof.

The connector 6 comprises an open end tip 14, a section 16 of larger outside diameter than said tip, spaced a short distance distally from said tip, outwardly extending tapered wall portion 18 joining the tip 14 with the section 16 of larger outside diameter, and inwardly tapered wall portion 20 extending distally of the largest outside diameter 16, to units with the tubular section 8.

The form of connector end catheter of FIG. 3 comprises a middle tubular section 8 and connector 6a formed with open end tip 14, a section 24 of larger outside diameter than said tip, tapered portion 26 joining the tip 14 with the section 24 and tapered portion 28 joining the section 24 with the section 8. The form of catheter of FIG. 3 differs from the form shown in FIG. 2 in the controlled thickness of the walls defining the connectors 6 and 6a. Thus, in FIG. 2, the walls of sections 16, 18 and 20 are all of uniform thickness, while in FIG. 3, the walls of the connector have a thickness which is proportional to the outside diameter of the tubing. This permits the rigidity of the connector 6a to be increased without changing the composition of the plastic forming the walls.

FIGS. 1, 2 and 3 all show in phantom line a fragmentary section of gum rubber tubing 22, which has been forced over the open tip 14 and outwardly tapering wall portions 18 to form a fluid-tight connection between the proximal end of the catheter and the connecting tubing 22.

The new catheters are produced by continuous extrusion methods which are capable of forming tapered sections at controlled intervals in the tubing as it extrudes. Such methods and apparatus for use therewith are disclosed and claimed in my copending application entitled "Production of Tapered Medico-Surgical Tubes Which Have Controlled Wall Thickness by Extrusion," filed June 3, 1958, Serial No. 739,628, now Patent No. 2,940,126.

The integral form of tubing connector as described herein may be incorporated in any generally known form of catheter, including, for example, so-called "oxygen catheters," "suction catheters," "rectal catheters," "duodenal tubes," "tracheal catheters," "infant feeding tubes" and the like. Also, such connectors may be formed integrally in connector tubes and other medico-surgical tubes. The distal end of catheters incorporating the new and integral tubing connectors can take a variety of forms, including the so-called "open-end tip," "whistle tip," "inflatable bulb tip," or any other specialized form of distal end which may be known or developed for use with special application catheters.

One of the distinct advantages of these new forms of catheters is the fact that they can be made transparent throughout their length. Thus, by using the continuous extrusion methods described in the copending application above referred to, it is possible to produce entirely transparent catheters, so that all sections thereof can be inspected for possible presence of foreign bodies, or inclusion of undesired matter. This inspection feature applies both to completely transparent catheters, as well as those provided with an X-ray opaque longitudinally extending line which may be formed as explained in my above-mentioned copending application, and such as are claimed in my copending application entitled "X-Ray Catheter," Serial No. 575,393, filed April 2, 1956, now Patent No. 2,857,915. On the other hand, where the physician, surgeon or other user prefers a fully opaque catheter, e.g., for use in special roentgenological procedures, the new integral tubing connectors can be incorporated in the opaque type catheter.

The new catheters can be formed from flexible, waterproof materials of various types, for example, rubber or synthetic rubber. However, since it is possible to provide greater variation, and at the same time better controlled flexibility in the tubes, it is preferable to use thermoplastic resinous materials to form the catheters. Examples of usable materials of this type include certain pliable or flexible forms of nylon, polyester plastics, polyethylene, and vinyl polymers, such as vinyl chloride polymers or copolymers with other vinyl esters such as vinyl acetate, vinylidene chloride polymers or the like.

FIG. 2 of the accompanying drawing shows the catheter to possess a substantially uniform wall thickness throughout its length. However, other forms of controlled wall thickness may be utilized in forming new catheters in accordance with this invention, as explained in my copending application S.N. 739,628. Thus, as shown in FIG. 3, the distal end 4 and tubular section 8 of the catheter can be formed with a substantially uniform wall thickness, while the connector end 6a can be formed with walls which increase in thickness as they taper outwardly, and conversely, so that the wall thickness at the point of outermost diameter, i.e., portion 24, would be of substantially greater thickness than the tubular section 8 or the tip 14, with the walls 26 and 28 gradually diminishing in width from the section 24 to the tip 14 and to the tubular section 8. This provides a method by which the rigidity in the connector end may be increased without detriment to the flexibility of the remainder of the catheter.

The size of the tubular connector 6 will be governed primarily by the size of the catheter 2, but principally by the diameter rather than the length of the catheter.

FIGURES 1 and 2 are exemplary of sizes of actual commercial catheters produced in accordance with this invention. Actually, this drawing illustrates an oxygen catheter of 14 French size, 16 inches long. Other specific catheters include duodenal tubes of 16 French size, 50 inches long, suction catheters of 10 to 18 French size, 22 inches long, infant feeding tubes between 5 French, 15 inch length to 8 French, 42 inch length, tracheal catheters of 10 or 14 French size, 15 inch length, and rectal tubes 24 French size, 20 inch length. Other medico-surgical tubes, such as oxygen connecting tubes 60 inches long, may also be supplied with new connector ends as herein described.

As indicated, the connector end 6 will usually have longer tapering wall sections 18 and 20 for tubes of larger diameter than for tubes of smaller diameter. Normally, the catheters will have a connector end with the open end tip 14 having an outside diameter between about ⅛ and ½ inch, and with the portion 16 having an outside diameter of about 1.2 and two times as large as the outside diameter of the open end tip 14. Similarly, the distance between the tip 14 and the large outside diameter section 16 will be between ½ and 2 inches, and the inwardly tapering wall portion 20 will have a similar length of extension from section 16 to the point of apparent union 24 with the tubular section 8. As shown in FIGS. 1–3, the distance between the tip 14 and the widest part of the connector end is preferably at least twice the outside diameter of such widest part.

It has been indicated above that one of the disadvantages associated with funnel-end type catheters is the inability of these catheters to make connections with all types of elements which might be encountered during catheter use. In contrast, the integral connector end catheters of this invention do have substantially universal adaptability. Thus, they can be used as shown in FIGS. 1 and 2 for making connections with gum rubber tubing or ribbed connectors. On the other hand, if it is desired to make a connection between these catheters and tapered end syringes or the like with which funnel end catheters would normally be employed, this can easily be accomplished by cutting off the section 18 of the connector end at the widest point 16, using scissors, scalpel or other sharp cutting instrument. When this is done, the catheter 2 will be left with a funnel end which can be used in any fashion known for handling of such funnel-end catheters. It will be immediately apparent that this constitutes a very worthwhile feature of the new catheters of this invention, since it makes possible a very substantial reduction in the inventory of catheters which must be maintained by the distributors or users of this type product, i.e., one of the new forms of catheters can in substance replace two separate forms of catheters previously required heretofore by the standard connecting practices employed in the use of surgical tubes.

The foregoing specification sets forth the precise invention for which patent protection is desired in a manner designed to distinguish it from other inventions and from what is old. It includes a specific embodiment of the new catheters and a description of the best mode contemplated for carrying out the invention, the scope of which is defined by the annexed claims.

I claim:
1. An extruded, seamless, non-fibrous, flexible medico-surgical tube formed of waterproof, flexible, plastic material with smooth inside and outside walls comprising a ported distal end, a connector formed as an integral part on the proximal end, and a longitudinally extended tubular section joining the distal end with said connector, said connector being defined by an open-end tip, a portion which extends distally of said tip and tapers outwardly to a widest part having an outside diameter between about 1.2 and 2 times as large as the outside diameter of said tip, said widest part being between about ½ and 2 inches from said tip, and a portion which tapers inwardly from said widest part joining said connector to said tubular section, the inside diameter of said connector being greater at said widest part than the inside diameter of said tip and said tubular section, said connector having a controlled rigidity as compared to the remainder of said tube by controlled thickness of the walls which are proportional in thickness to the outside diameter of the connector.

2. An extruded, seamless, non-fibrous, flexible medico-surgical tube formed of waterproof, flexible, plastic material with smooth inside and outside walls comprising a ported distal end, a connector formed as an integral part on the proximal end, and a longitudinally extended tubular section joining the distal end with said connector, said connector being defined by an open-end tip, a portion which extends distally of said tip and tapers outwardly to a widest part having an outside diameter between about 1.2 and 2 times as large as the outside diameter of said tip, said widest part being a distance from said tip at least twice the outside diameter of said widest part, and a portion which tapers inwardly from said widest part joining said connector to said tubular section, the inside diameter of said connector being greater at said widest part than the inside diameter of said tip and said tubular section, said connector having a controlled rigidity as compared to the remainder of said tube by controlled thickness of the walls which are proportional in thickness to the outside diameter of the connector.

References Cited in the file of this patent
UNITED STATES PATENTS

| | | |
|---|---|---|
| 204,314 | George | May 28, 1875 |
| 324,429 | Suydam | Aug. 18, 1885 |
| 862,507 | Quimby | Aug. 6, 1907 |
| 2,458,305 | Sanders | Jan. 4, 1949 |
| 2,780,835 | Sherman | Feb. 12, 1957 |

OTHER REFERENCES

A.C.M.I. Catheters, Drains, Borgies Catalogue. (Copyright 1938, page 34 required.)